Oct. 4, 1966
E. M. TUCKER, JR  3,276,823
VEHICLE SUPPORTING AND DRIVE UNIT WITH
FLEXIBLE ROLLING ENVELOPE
Filed Nov. 9, 1964
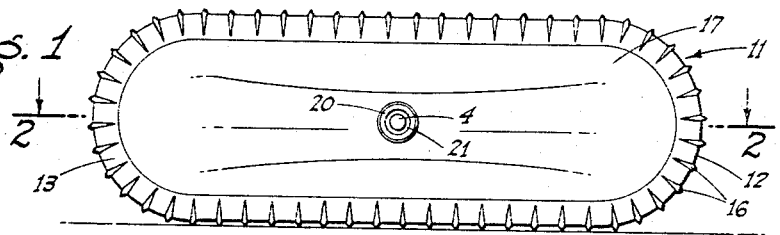
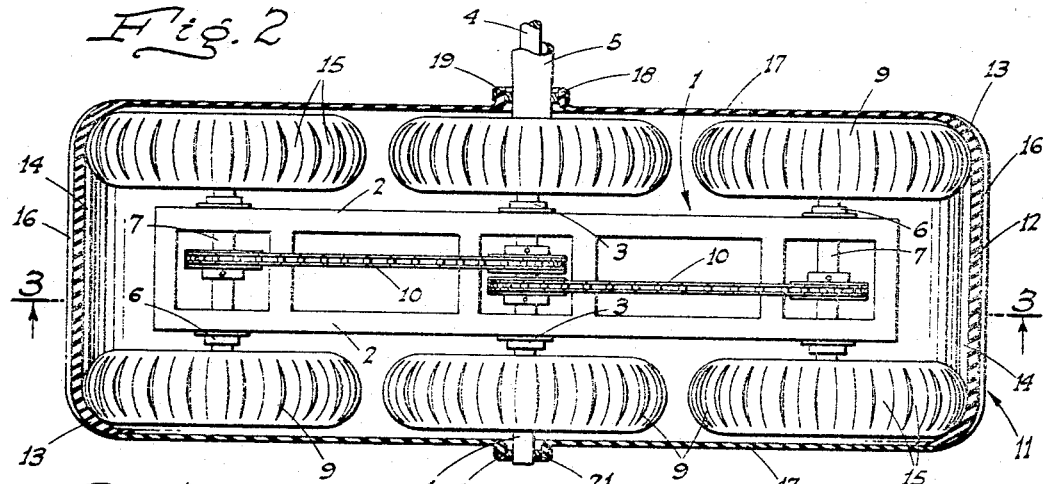
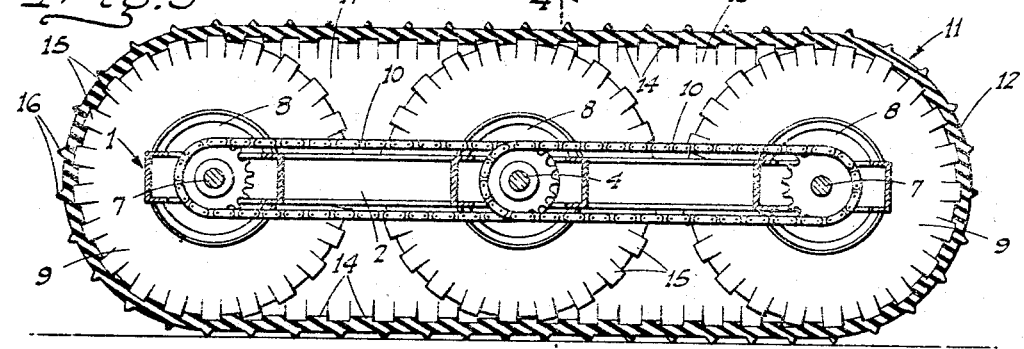
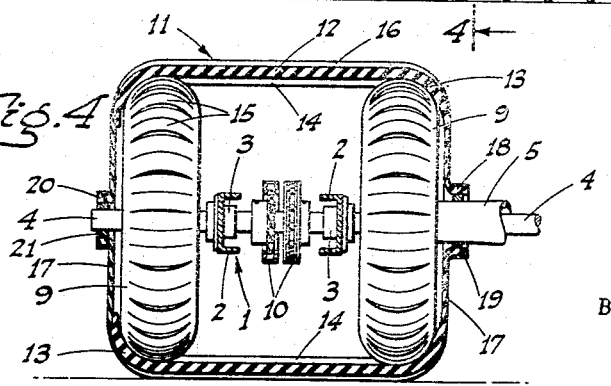
INVENTOR.
Emmitt M. Tucker, Jr.
BY
Webster & Webster
ATTYS.

United States Patent Office 3,276,823
Patented Oct. 4, 1966

3,276,823
VEHICLE SUPPORTING AND DRIVE UNIT WITH
FLEXIBLE ROLLING ENVELOPE
Emmitt M. Tucker, Jr., Ashland, Oreg.
Filed Nov. 9, 1964, Ser. No. 409,863
3 Claims. (Cl. 305—11)

This invention relates to motor vehicles, and particularly to the supporting and drive means for vehicles which are primarily adapted to travel over snow covered terrain, but which are also suited for travel over almost any kind of terrain on which ordinary wheels do not give the necessary support or traction.

It has heretofore been the custom to equip this form of vehicle with conventional endless metal tracks in order to provide the desired support and traction. A representative showing of such a vehicle is found in United States Patent No. 2,561,716.

It is the major object of the present invention to provide a vehicle supporting and drive unit which—while retaining the advantages of conventional endless metal tracks—avoids their disadvantageous features such as the abrasion and excessive wear thereof due to the exposure of the same to the loose materials of the terrain being traversed by the tracks.

Another important object of the invention is to provide a vehicle supporting and drive unit, as above, which includes what may be generally termed an elongated, flexible rolling envelope; such envelope enclosing the remainder of the unit.

An additional object of the invention is to provide a vehicle supporting and drive unit which—by virtue of the inclusion of such rolling envelope—attains enhanced support and traction in comparison to both ordinary wheels and conventional endless tracks.

A further object of the invention is to provide a vehicle supporting and drive unit which is designed for ease and economy of manufacture.

A still further object of the invention is to provide a practical, reliable, and durable vehicle supporting and drive unit and one which is exceedingly effective for the purpose for which it is designed.

These objects are accomplished by means of such structure and relative arrangement of parts as will fully appear by a perusal of the following specification and claims.

In the drawing:

FIG. 1 is a side elevation of the improved vehicle supporting and drive unit.

FIG. 2 is an enlarged sectional plan of the unit, taken on line 2—2 of FIG. 1.

FIG. 3 is a longitudinal sectional elevation of the unit taken substantially on line 3—3 of FIG. 2.

FIG. 4 is a transverse sectional elevation of the unit, taken substantially on line 4—4 of FIG. 3.

Referring now more particularly to the drawing and to the characters of reference marked thereon, the unit comprises an elongated, longitudinally extending skeleton frame 1 of relatively narrow width, and which frame includes transversely spaced side rails 2. These rails support bearings 3 for the central, transverse drive shafe 4 of the unit; said shaft, beyond the inner side of the unit, being supported in a tubular, laterally extending housing 5. Such housing 5 projects from the vehicle chassis (not shown) which is supported by the units in the manner illustrated in United States Patent No. 2,561,716.

The rails 2 also support bearings 6 for other transverse shafts 7; these shafts being disposed equal distances in opposite directions from the central shaft 4. The above identified shafts are each fitted with transversely spaced wheels 8 which include pneumatic tires 9; all said wheels and tires being the same size. The wheels on each shaft are positioned on opposite sides of the frame 1 and relatively close to the side rails 2 thereof.

The shafts 4 and 7 are simultaneously driven from the drive shaft 4 at the same speed and in the same direction by means of endless chain drive units 10 disposed between the side rails 2. Each such drive unit extends between the shaft 4 and one of the shafts 7; the two units being, of course, disposed in transversely separated relation on the shaft 4 as shown in FIG. 2.

The wheels 8 and the frame 1, together with the above described driving mechanism, are concealed within an elongated, flexible enclosure or rolling envelope indicated generally at 11 and which is constructed in the present embodiment as follows:

Extending about an engaging the opposed peripheral portions of the endmost tires 9 as well as the top and bottom peripheral portions of the central tires is an endless, elongated band 12 of heavy duty wear resistant rubber; such band being a length such that it snugly engages the tires. The band 12 is rounded at its sides, as at 13, to conform to the transverse curvature of the crown of the tires so that there is no tendency for the band 12 to slip to one side or the other.

On its inner face the band 12 is formed with transverse ribs 14 which engage in the spaces between transverse ribs 15 of the tires in gear-like non-slipping relation. Also, the band 12 on its outer face is formed with transverse cleats 16 to engage the snow or ground in non-skidding traction relation.

The enclosure or rolling envelope 11 also includes what may be termed side curtains 17. These curtains are made of strong sheet rubber but which has great flexibility and elasticity; each curtain extending unbroken over, and providing a closure for, the entire corresponding side area outlined by the band 12.

Each side curtain 17 is secured in watertight relation to the related laterally outer edge of the band 12; the curtains 17 being relatively thin compared to the thickness of said band 12. Such band, which includes the curved side portions 13, is slightly wider than the distance between the opposed outer sides of the various tires so that the curtains will not abrasively contact such tire sides.

The tubular housing 5 projects through the adjacent curtain 17 and said curtain is provided with a collar 18 which surrounds the housing 5 in clearance relation thereto; there being a seal 19 in the collar about the housing 5 in turnable relation. Similarly, the drive shaft 4 projects through the opposite curtain 17; the latter being provided with a collar 20 surrounding the projecting portion of said shaft 4 in clearance relation and there being a seal 21 in the collar 20 about said shaft in turnable relation. The two collars and their seals prevent any sagging of the related curtains at points centrally of the length and height thereof.

It will, of course, be understood that at least one of the curtains is detachably connected in any suitable manner to the band 12; this in order that the enclosure or rolling envelope 11 may be initially placed about the frame supported wheels, and such one curtain subsequently removed should any servicing or repair of any of the parts within the enclosure be necessary.

In operation, it will be understood that as the drive shaft 4 rotates, all the wheels 8 are simultaneously rotated in the same direction and at the same speed. Such rotation imparts movement to the flexible, endless band 12 in the manner of a conventional endless metal track and thus advances the unit along the ground. While the band 12 is thus continuously traveling about an elongated path of fixed dimensions, the curtains 17 (which move with the band) become continuously and throughout their areas, stretched and relaxed between a minimum position in the vertical plane of the centrally located shaft 4, and a maximum position in the horizontal plane of all the shafts; all such stretching and relaxing actions taking place about the collars 18 and 20 as relatively fixed points.

The vehicle supporting and drive unit, as herein described, is operative—by reason of the inclusion of the flexible, endless rolling envelope—to provide a relative high flotation effect or support and effective traction, while at the same time preventing access of foreign material or water to the structure within such envelope.

From the foregoing description, it will be readily seen that there has been produced such a vehicle supporting and drive unit as substantially fulfills the objects of the invention, as set forth herein.

While this specification sets forth in detail the present and preferred construction of the vehicle supporting and drive unit, still in practice such deviations from such detail may be resorted to as do not form a departure from the spirit of the invention, as defined by the appended claims.

Having thus described the invention, the following is claimed as new and useful and upon which Letters Patent is desired:

1. A vehicle supporting and drive unit comprising a central pair of transversely spaced wheels, a drive shaft connected to the wheels and projecting laterally out from one wheel, a tubular housing projecting laterally out from said one wheel and in which housing the adjacent portion of the shaft is supported, end pairs of similarly transversely spaced wheels disposed in equally spaced relation to the central wheels ahead and rearwardly of the same, a longitudinal frame between and supporting all the wheels, a flexible endless track-forming band extending between and engaging about the wheels, flexible and stretchable curtains covering the side areas outlined by the band and said curtains being secured to the side edges of the band throughout its extent, the curtain on the side from which the housing projects being provided with an opening surrounding the adjacent portion of the housing, said portion being circular, and a collar and seal assembly on said curtain about the opening and engaging said housing portion in turnable relation.

2. A unit, as in claim 1, in which the drive shaft projects laterally out from the other wheel of the central pair; the related curtain having an opening therethrough about the projecting portion of the drive shaft, and a collar and seal assembly on said curtain about the opening and engaging said shaft portion in turnable relation.

3. A vehicle supporting and drive unit comprising longitudinally spaced wheels, means including a frame mounting the wheels in predetermined spaced relation to each other, a flexible nonporous endless track-forming band extending between and engaging about the wheels, and flexible and stretchable nonporous curtains covering the side areas outlined by the band and secured to the side edges thereof throughout their extent; said curtains together with the band forming a flexible rolling envelope enclosing the wheels and frame, the peripheral faces of the wheels being transversely curved, and the side portions of the band being curved to conform to the curvature of the wheel faces, the curtains being clear of said wheel faces.

References Cited by the Examiner

UNITED STATES PATENTS

| | | | |
|---|---|---|---|
| 2,219,533 | 10/1940 | Ross | 180—22 X |
| 2,652,289 | 9/1953 | Bekker | 305—34 X |
| 2,652,290 | 9/1953 | Bekker | 305—34 X |
| 2,878,883 | 3/1959 | France. | |
| 3,107,128 | 10/1963 | Ruane | 305—57 X |

BENJAMIN HERSH, *Primary Examiner.*

R. J. JOHNSON, *Assistant Examiner.*